United States Patent [19]

Beard

[11] Patent Number: 5,734,585
[45] Date of Patent: Mar. 31, 1998

[54] METHOD AND APPARATUS FOR SEQUENCING POWER DELIVERY IN MIXED SUPPLY COMPUTER SYSTEMS

[75] Inventor: Paul Beard, Milpitas, Calif.

[73] Assignee: Norand Corporation, Cedar Rapids, Iowa

[21] Appl. No.: 399,060

[22] Filed: Mar. 8, 1995

Related U.S. Application Data

[63] Continuation-in-part of Ser. No. 335,209, Nov. 7, 1994, abandoned.

[51] Int. Cl.⁶ .................................................. G06F 13/00
[52] U.S. Cl. ........................... 364/492; 326/63; 326/81; 323/300; 363/74; 395/750.08
[58] Field of Search .................. 364/492 C; 307/475, 307/451, 473; 323/299, 300; 363/84, 81, 85; 326/63, 68, 81; 395/750

[56] References Cited

U.S. PATENT DOCUMENTS

| | | | |
|---|---|---|---|
| 4,885,521 | 12/1989 | Crampton | 320/14 |
| 5,300,835 | 4/1994 | Assar et al. | 307/475 |
| 5,307,257 | 4/1994 | Fukushima | 363/53 |
| 5,440,244 | 8/1995 | Richter et al. | 326/37 |
| 5,515,134 | 5/1996 | Taguchi | 354/484 |
| 5,542,035 | 7/1996 | Kikinis et al. | 395/750 |

*Primary Examiner*—Emanuel T. Voeltz
*Assistant Examiner*—Kamini Shah
*Attorney, Agent, or Firm*—Suiter & Associated PC

[57] ABSTRACT

The present invention discloses a sequence and circuitry for powering a mixed logic voltage computer system wherein power is delivered to the system hardware in increasing order according to the power consumption level of the particular system hardware such that system power consumption during system startup is minimized.

3 Claims, 3 Drawing Sheets

METHOD AND APPARATUS FOR SEQUENCING POWER DELIVERY IN MIXED SUPPLY COMPUTER SYSTEMS

CROSS-REFERENCE TO RELATED APPLICATION

The present application is a continuation-in-part of U.S. application Ser. No. 08/335,209 filed Nov. 7, 1994 now abandoned.

The present application may be utilized as the regulating means for regulating the voltage of a power cell and for providing the appropriate voltage to a utilization device as described in U.S. application Ser. No. 08/384,570 filed on Feb. 6, 1995 now abandoned. Said U.S. application Ser. No. 08/384,570 is incorporated herein by reference.

The present invention may also be utilized in conjunction with the power source control circuit for power control during battery charging or as a subcircuit of the power supply system for supplying the multiple logic voltage levels of a hand held portable data terminal as described in U.S. application Ser. No. 08/379,684 filed Jan. 25, 1995 now abandoned. Said U.S. application Ser. No. 08/379,684 is incorporated herein by reference.

TECHNICAL FIELD

The invention relates generally to power supplies of computer hardware devices, and specifically to systems which implement mixed logic voltage supply levels.

BACKGROUND ART

Computer systems are becoming increasingly more portable while at the same time becoming increasingly more powerful. Low power consumption is an essential design criterion of portable battery powered computer systems and data terminals. For this reason much of the hardware in a portable computer system, such as the system microprocessor, operates at lower logical voltage supply levels, typically 3.3 volts, because systems operating at lower voltages consume less power than systems operating at higher voltages. The most common computer hardware devices operate at 5.0 volts for logic voltage levels. Portable data terminals and other laptop type computer systems employ microprocessors and other hardware devices which operate at 3.3 volts for logic voltage levels in order to reduce system power consumption and thereby extend operational battery time.

In order to maintain compatibility with computer systems and peripheral devices that operate at the more common 5.0 volt logic voltage supply levels, many portable data terminals are designed to operate at mixed logic voltage levels wherein the microprocessor and supporting hardware operate at 3.3 volts to take advantage of the lower power consumption these devices offer, and the hardware for external peripheral control operates at 5.0 volts in order to take advantage of being able to interface and communicate with standard computer equipment.

Because maintaining low power consumption and preserving battery energy are important design criteria in portable data terminal systems, the dynamics of delivering power in mixed supply logic voltage computer systems must be taken into account. Characteristically, the powering up of the system hardware devices requires more power than the average power consumed during normal operations, and therefore it is of great advantage to preserve battery energy by minimizing power consumption during system startup. A prudently designed power supply system for mixed logic voltage level computer hardware considers the order in which the devices are powered up and the system hardware is reset. Energy may be conserved in mixed supply logic voltage computer systems by ensuring that power is delivered to all devices operating at lower logic voltage levels before power is delivered to devices operating at higher logic voltage levels. Consideration of the order of powering the hardware devices is especially beneficial in portable computer systems wherein the terminal is frequently shutdown and placed into a suspend mode in order to preserve power and is then powered up again upon resumption of normal operation.

For the foregoing reasons, there is a need for a power supply system in mixed logic voltage computer systems that delivers power to the system hardware subcircuitry in a sequence based upon the logic voltage levels at which the particular devices of the subcircuitry operate in order to minimize startup power consumption.

DESCRIPTION OF AN EXEMPLARY EMBODIMENT

Figure 1:
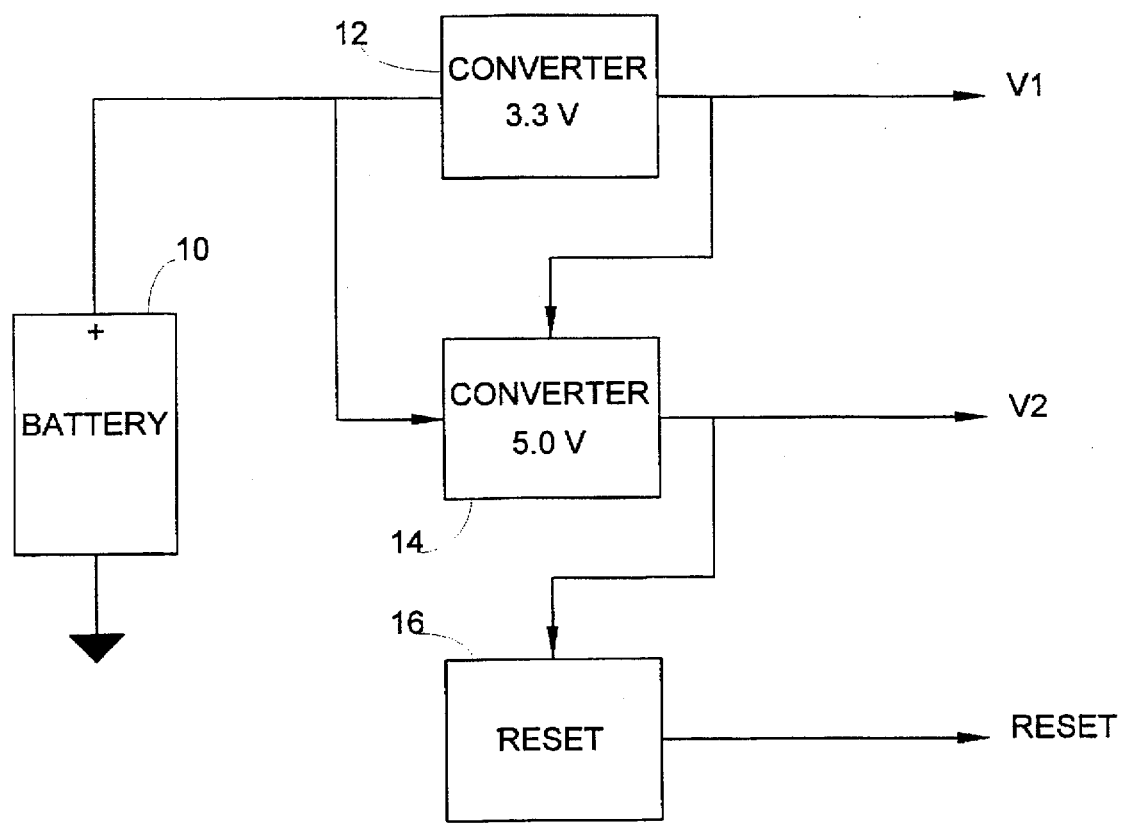
FIG. 1 is a diagram of a mixed logic voltage level power supply system.

FIG. 1 depicts the power supply layout and the interconnection of the subcircuitry for delivering power to the devices in a typical data terminal computer system. The battery 10 ("BATTERY") is the main power source in a portable data terminal system, and is connected to the input terminals of the power converter 12 ("CONVERTER 3.3 V") for the system hardware devices which operate at 3.3 volts and the power converter 14 ("CONVERTER 5.0 V") for the system hardware devices that operate at 5.0 volts. The output V1 of the 3.3 volt converter 12 supplies power at a 3.3 volt logic voltage level to the hardware operating at 3.3 volt logic levels. The output V2 of the 5.0 volt converter 14 supplies power at a 5.0 volt logic level to the hardware operating at 5.0 volt logic levels.

Additionally, the output V1 of the 3.3 volt converter 12 connects to the shutdown pin of the 5.0 volt converter 14. The output of the 5.0 volt converter 14 connects to the input of the RESET subcircuitry 16 ("RESET"). The RESET subcircuitry 16 supplies a digital signal to the system hardware devices for reinitialization of the logical states. With the power supply circuits arranged in tandem in the above described fashion, power is delivered sequentially to the system subcircuitry.

Figure 2:
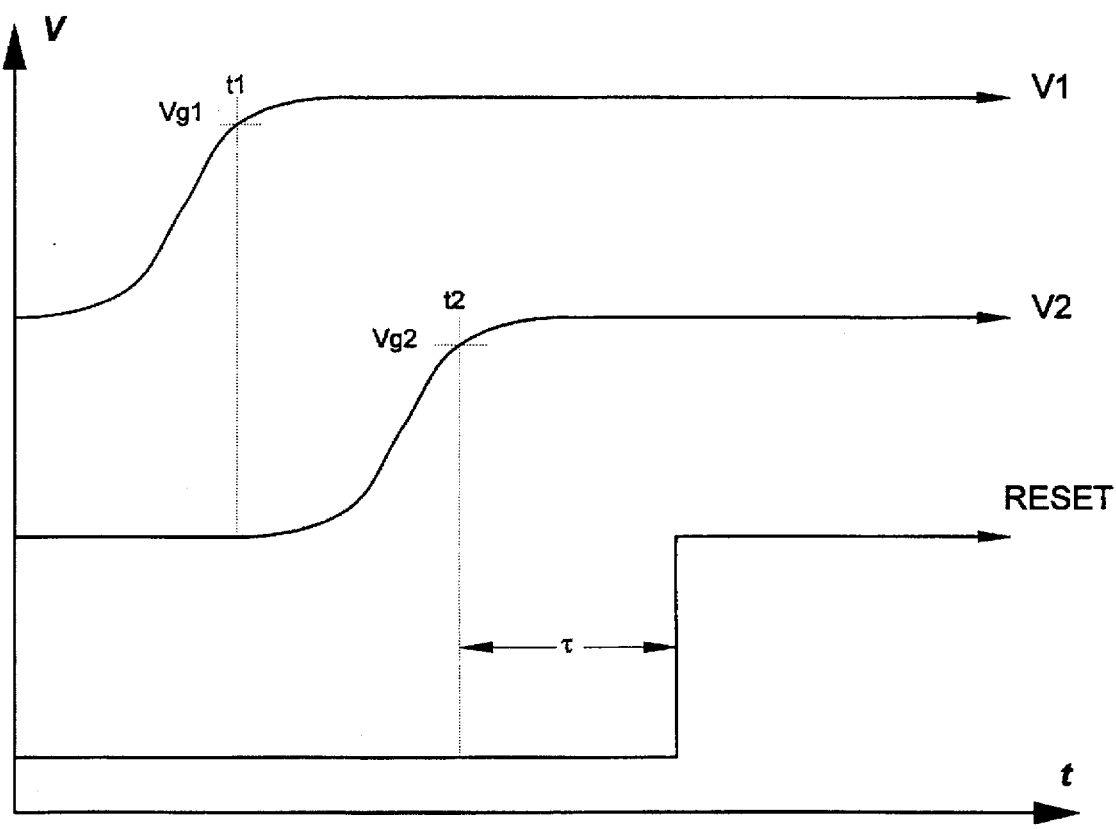
FIG. 2 is a timing diagram of the subcircuit voltages in a mixed logic voltage level power supply system.

FIG. 2 illustrates the timing of the order in which the logic voltage supply signals power the system hardware. The vertical axis illustrates the increasing relative voltage levels for the power supply subcircuits. The vertical axis represents the direction of increasing voltage only, as the purpose of the diagram is to illustrate the timing sequence of the individual subcircuits. The horizontal axis delineates the time at which switching of the powering of the subcircuits occurs.

V1 represents the waveform of the output of the 3.3 volt converter 12. During power up, the 3.3 volt converter 12 is the first subcircuit to receive power. The output of the 3.3 volt converter 12 increases over time ultimately reaching a nominal value of 3.3 volts. During the time which the 3.3 volt converter 12 is being powered up, the 5.0 volt converter 14 and the RESET 16 subcircuits receive no power.

Referring back to FIG. 1, the output V1 of the 3.3 volt converter 12 connects to the shutdown pin of the 5.0 volt converter 14. This arrangement causes the 5.0 volt converter 14 to remain off even though there is a power signal connected to the input terminal of the 5.0 volt converter 14. Further, the 5.0 volt converter 14 supplies the power for the RESET subcircuitry 16, and therefore the RESET subcircuitry 16 will not send a RESET signal until it receives power from the 5.0 volt converter 14. Correspondingly, the output V2 from the 5.0 volt converter 14 and the RESET 16 subcircuits during the power up of the 3.3 volt converter 12 is zero. Thus, in an exemplary embodiment, the system hardware operating at 3.3 volt logic levels is powered up before any other system hardware.

The output voltage V1 of the 3.3 volt converter 12 rises until it reaches a voltage Vg1 sufficient to turn on the 5.0 volt converter 14. In an exemplary embodiment Vg1 is approximately 3.0 volts. This occurs at a time t1, at which time the output voltage V2 of the 5.0 volt converter 14 begins to rise as the 5.0 volt converter 14 is powered up. The output voltage of the 5.0 volt converter 14 increases until it reaches a voltage Vg2 sufficient to power the RESET subcircuitry 16. This occurs at time t2, at which time the RESET subcircuitry 16 begins to receive power. The output of the RESET subcircuitry 16 occurs after a time delay of τ resulting from the charge time of the internal RESET subcircuitry 16. The output voltage of the RESET subcircuitry 16 is the RESET digital signal for reinitialization of system hardware. System hardware cannot be reinitialized until the 5.0 volt hardware receives power.

Thus, the order in which the system hardware receives power is as follows:

1. The battery delivers power to the power supply converters;
2. The 3.3 volt hardware is powered up;
3. The 5.0 volt hardware is powered up;
4. The reset circuitry is powered up;
5. System hardware is reinitialized.

Figure 3:
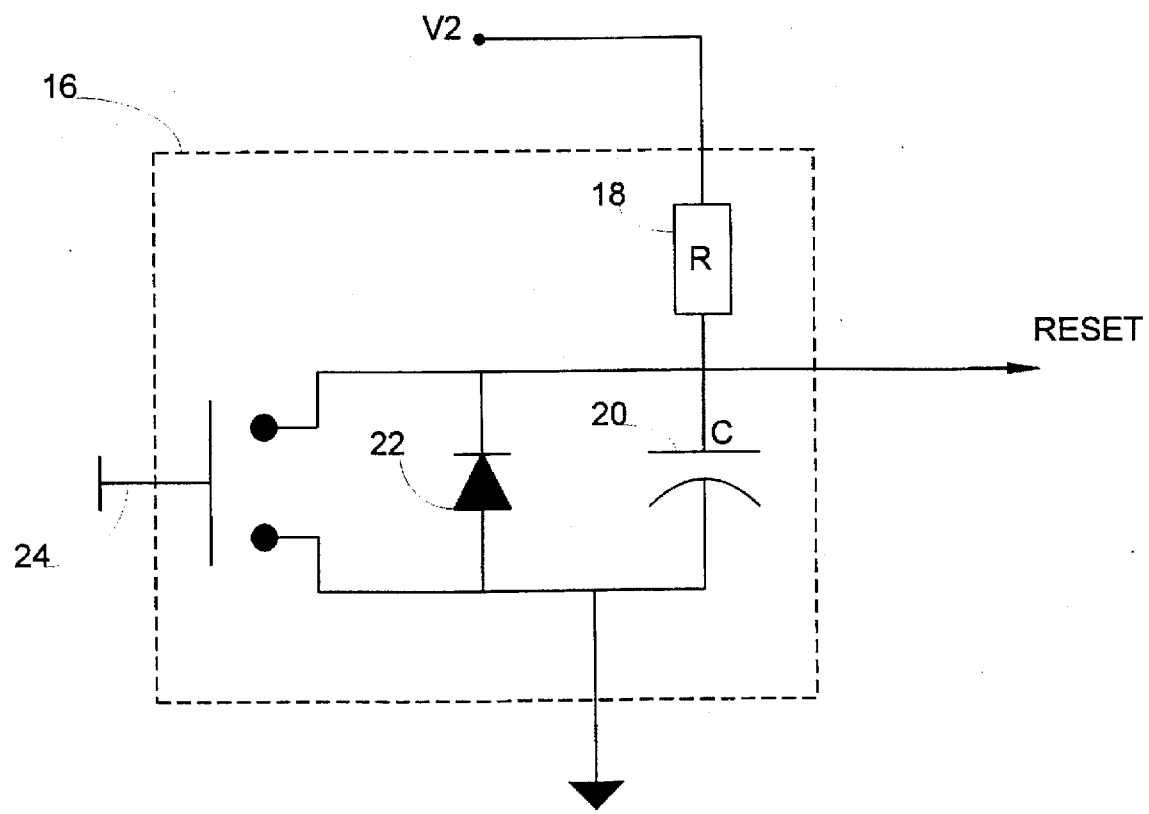
FIG. 3 is an illustration of the internal circuitry arrangement in the reset subcircuitry in a mixed logic voltage level power supply system.

FIG. 3 depicts the internal circuitry of the RESET subcircuitry 16. The output V2 of the 5.0 volt converter 14 supplies the power for the RESET subcircuit 16. The power supply input V2 of the RESET subcircuit 16 connects in series to a resistor 18 ("R") which further connects to a capacitor 20 ("CC"), such node being the RESET output signal of the RESET subcircuitry 16. The cathode of a diode 22 in connected in parallel with the capacitor 20 also connects to the output node. A pushbutton reset switch 24 connects in parallel with the diode 22 and the capacitor 20. The pushbutton reset switch 24 allows for manual reinitialization of system hardware.

The capacitor 20 and the resistor 18 determine the RESET signal delay time τ, which is the delay from t2, when the 5.0 volt converter 14 is powered up, to the time at which the RESET subcircuitry 16 may send a RESET signal. The delay time is τ is determined by the following relation:

τ=RC

The time delay τ of the RESET subcircuit 16 ensures that the RESET signal will not be asserted high until after the 3.3 volt hardware and the 5.0 volt hardware receive power.

Thus, in an exemplary embodiment, the RESET signal is always asserted low when them is no signal available from the 5.0 volt converter 14. Additionally, the RESET signal is not asserted high unless the output signal V2 of the 5.0 volt converter 14 is present at the input of the RESET subcircuit 16, even when the pushbutton reset switch 24 is depressed.

In an alternative embodiment, the aforementioned power supply and accompanying circuitry may be mounted in a self-contained battery pack unit. A self-contained battery pack arrangement of the herein disclosed invention allows for employment of the invention in currently existing mixed logic voltage computer systems such that these currently existing systems may obtain the advantages of the invention without the need for redesign of these systems. Additionally, any future redesign or other improvements of the existing invention may be implemented without significant redesign of the preexisting computer systems, thereby reducing costs associated therewith.

Thus, there has been described a power supply system in a mixed logic voltage computer system that achieves the object of delivering power to the system hardware subcircuitry in a sequence based upon the logic voltage levels at which the particular devices of the subcircuitry operate in order to minimize startup power consumption.

What is claimed is:

1. A power delivery circuit for a mixed logic voltage level computer system comprising:

a power source having an output for providing power to the mixed logic voltage level computer system;

a first voltage converter for providing a first logic voltage level output, said first voltage converter receiving said output of said power source;

a second voltage converter for providing a second logic voltage level output, said second voltage converter receiving said output of said power source, said second voltage converter having a shutdown pin receiving said first logic voltage level output of said first voltage converter wherein said second voltage level output is provided to the computer system subsequent to said first logic voltage level output being provided to the compmer system; and a reset circuit for providing a reset signal to the computer system for hardware state reinitialization, said reset circuit receiving said second logic voltage level output of said second voltage converter wherein said reset signal is provided to the computer system subsequent to said second logic voltage level output being provided to the computer system.

2. A power delivery circuit for a mixed logic voltage level computer system as claimed in claim 1, wherein said reset circuit comprises:

(a) a diode, a capacitor and a normally open switch connected in parallel, said diode having an anode and a cathode, said anode being grounded; and (b) a resistor having first and second ends, said first end of said resistor receiving said second logic voltage level output of said second voltage converter, said second end of said resistor being connected to said capacitor thereby being connected in series with said diode, said capacitor and said normally open switch.

3. A power delivery circuit for a mixed logic voltage level computer system as claimed in claim 2, wherein said reset signal of said reset circuit is provided to the computer system for hardware state reinitialization when said normally open switch is closed.

* * * * *